US012609814B2

(12) United States Patent
Li et al.

(10) Patent No.: US 12,609,814 B2
(45) Date of Patent: Apr. 21, 2026

(54) HARDWARE-INTEGRATED CRYPTOGRAPHIC SIGNING AND ENCRYPTION FOR HUMAN INTERFACE DEVICE ACTIONS

(71) Applicant: Lenovo (Singapore) Pte. Ltd., Singapore (SG)

(72) Inventors: Scott Li, Cary, NC (US); Igor Stolbikov, Apex, NC (US); Robert J. Kapinos, Durham, NC (US); Robert James Norton, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 125 days.

(21) Appl. No.: 18/622,335

(22) Filed: Mar. 29, 2024

(65) Prior Publication Data

US 2025/0310085 A1     Oct. 2, 2025

(51) Int. Cl.
| | |
|---|---|
| *H04L 29/06* | (2006.01) |
| *H04L 9/08* | (2006.01) |
| *H04L 9/32* | (2006.01) |

(52) U.S. Cl.
CPC .......... *H04L 9/0825* (2013.01); *H04L 9/3247* (2013.01); *H04L 9/3297* (2013.01)

(58) Field of Classification Search
CPC .... H04L 9/0825; H04L 9/3247; H04L 9/3297
See application file for complete search history.

(56) References Cited

U.S. PATENT DOCUMENTS

| | | | | |
|---|---|---|---|---|
| 8,826,028 B1 * | 9/2014 | Boyington | ............ | G06F 21/606 |
| | | | | 713/182 |
| 11,128,609 B1 * | 9/2021 | Feinberg | ................... | H04L 9/14 |
| 11,206,131 B1 * | 12/2021 | Griffin | .................. | H04L 9/0869 |
| 11,218,300 B1 * | 1/2022 | Shea | ..................... | H04L 9/0897 |
| 11,451,402 B1 * | 9/2022 | Pepe | ..................... | H04L 9/3231 |
| 11,676,316 B1 * | 6/2023 | Lopez | ................... | G06F 16/176 |
| | | | | 345/619 |
| 2006/0107062 A1 * | 5/2006 | Fauthoux | .............. | H04L 9/3226 |
| | | | | 713/182 |
| 2006/0200854 A1 * | 9/2006 | Saito | ..................... | H04L 9/3247 |
| | | | | 713/176 |
| 2010/0328074 A1 * | 12/2010 | Johnson | .................. | G06F 21/31 |
| | | | | 340/573.1 |
| 2011/0055585 A1 * | 3/2011 | Lee | ........................ | H04L 9/3226 |
| | | | | 713/183 |
| 2011/0202393 A1 * | 8/2011 | DeWakar | .......... | G06Q 20/3223 |
| | | | | 705/13 |
| 2017/0263208 A1 * | 9/2017 | Imai | ....................... | G09G 5/373 |

(Continued)

FOREIGN PATENT DOCUMENTS

| | | | | | |
|---|---|---|---|---|---|
| AU | 2022283634 A1 * | 9/2023 | ............... | H04L 9/08 |
| CN | 113890727 A * | 1/2022 | .......... | H04L 63/062 |
| EP | 3073368 A1 * | 9/2016 | ............. | G06F 3/167 |

(Continued)

*Primary Examiner* — Sher A Khan

(74) *Attorney, Agent, or Firm* — Schwegman Lundberg & Woessner, P.A.

(57) ABSTRACT

A human interface device (HID) such as a keyboard or a mouse receives data, the HID cryptographically signs the data using a private key of a first user. The HID generates a report using the cryptographically signed data, and transmits the report to a processor for use in authenticating that the data were input by a human.

20 Claims, 6 Drawing Sheets

(56) References Cited

U.S. PATENT DOCUMENTS

2019/0238519 A1 * 8/2019 Bikumala ........... H04L 63/0823

FOREIGN PATENT DOCUMENTS

| JP | WO2003069491 | A1 | * | 6/2005 | ........... G06F 21/316 |
| KR | 20180079806 | A | * | 7/2018 | ............... H04L 9/32 |
| TW | I526934 | B | * | 3/2016 | ........... G06F 9/4401 |
| WO | WO-2009104260 | A1 | * | 8/2009 | ........... H04L 9/3247 |
| WO | WO-2018203512 | A1 | * | 11/2018 | ............. G06V 40/16 |

* cited by examiner

100

120

110

130

| FIELD NAME | FIELD TYPE | FIELD SIZE (BYTES) | EXAMPLE VALUE | DESCRIPTION |
|---|---|---|---|---|
| REPORT ID | STANDARD | 1 | 0X01 | UNIQUE ID TO IDENTIFY THE REPORT FORMAT. |
| MODIFIER BYTE | STANDARD | 1 | 0X20 (FOR SHIFT KEY) | INDICATES MODIFIER KEYS PRESSED. |
| RESERVED BYTE | STANDARD | 1 | 0X00 | RESERVED FOR ALIGNMENT, TYPICALLY ZERO. |
| KEYCODE BYTES | STANDARD | 6 | 0X04, 0X00... (UP TO 6) | KEY CODES FOR KEYS THAT ARE PRESSED. |
| TIMESTAMP | CUSTOM | 4 OR 8 | X5F2B3D4A (EXAMPLE) | THE TIME WHEN THE KEY WAS PRESSED. |
| NONCE | CUSTOM | 2 OR 4 | 0XD4F3 (EXAMPLE) | RANDOM NUMBER GENERATED FOR THE EVENT. |
| SIGNATURE | CUSTOM | VARIABLE | 0X9A3BCD... (TRUNCATED) | SIGNATURE OF THE KEY EVENT DATA. |
| KEY ID | CUSTOM | 1 | 0X07 | IDENTIFIER FOR THE CRYPTOGRAPHIC KEY USED. |
| BATTERY LEVEL | CUSTOM (OPTIONAL) | 1 | 0X64 (100% CHARGED) | CURRENT BATTERY LEVEL FOR WIRELESS KEYBOARDS. |
| DEVICE ID | CUSTOM | 1 | 0X02 | IDENTIFIER FOR THE KEYBOARD DEVICE. |
| STATUS FLAGS | CUSTOM | 1 | 0X03 (CAPS LOCK ON, ETC.) | VARIOUS STATUS FLAGS. |

*Fig.2*

| ALGORITHM | KEY SIZE | SIGN TIME(S) | VERIFY TIME(S) | SIGN/S | VERIFY/S |
|---|---|---|---|---|---|
| RSA | 1024 BIT | 0.000118 | 0.000007 | 8464.7 | 136410.1 |
| RSA | 2048 BIT | 0.000561 | 0.000025 | 1783.1 | 40764.8 |
| RSA | 4096 BIT | 0.005938 | 0.000089 | 168.4 | 11194.9 |
| ECDSA (SECP160R1) | 160 BIT | 0.0001 | 0.0002 | 16173.3 | 5905.4 |
| ECDSA (NISTP224) | 224 BIT | 0.0001 | 0.0001 | 12410.4 | 7839.6 |
| ECDSA (NISTP256) | 256 BIT | 0.0001 | 0.0001 | 16268.6 | 11458.9 |
| ECDSA (NISTP384) | 384 BIT | 0.0002 | 0.0007 | 4765.4 | 1434.2 |
| ECDSA (NISTP521) | 521 BIT | 0.0004 | 0.0006 | 2644.5 | 1703.9 |

*Fig. 3*

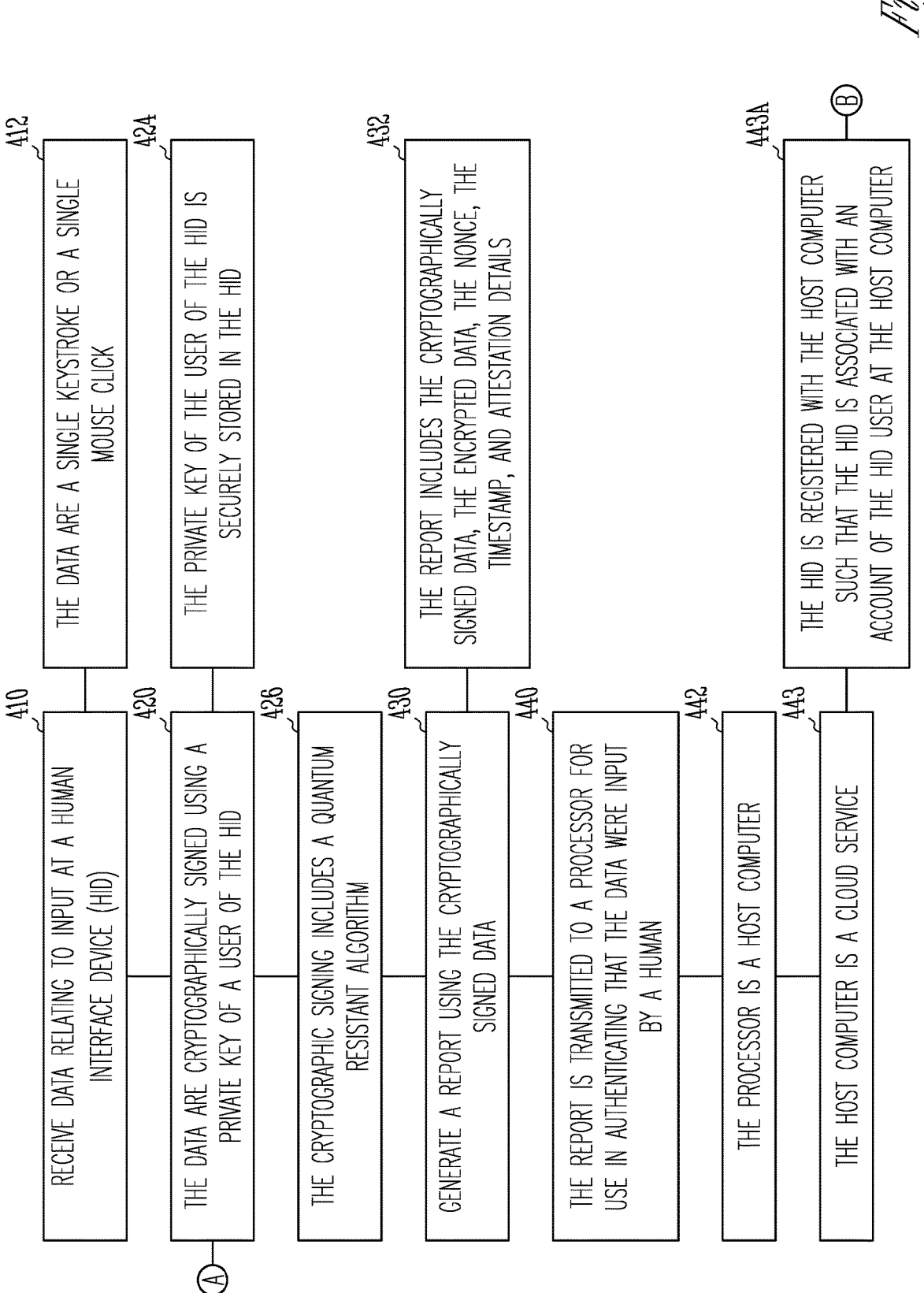

*Fig. 4A*

410 RECEIVE DATA RELATING TO INPUT AT A HUMAN INTERFACE DEVICE (HID)

412 THE DATA ARE A SINGLE KEYSTROKE OR A SINGLE MOUSE CLICK

420 THE DATA ARE CRYPTOGRAPHICALLY SIGNED USING A PRIVATE KEY OF A USER OF THE HID

424 THE PRIVATE KEY OF THE USER OF THE HID IS SECURELY STORED IN THE HID

426 THE CRYPTOGRAPHIC SIGNING INCLUDES A QUANTUM RESISTANT ALGORITHM

430 GENERATE A REPORT USING THE CRYPTOGRAPHICALLY SIGNED DATA

432 THE REPORT INCLUDES THE CRYPTOGRAPHICALLY SIGNED DATA, THE ENCRYPTED DATA, THE NONCE, THE TIMESTAMP, AND ATTESTATION DETAILS

440 THE REPORT IS TRANSMITTED TO A PROCESSOR FOR USE IN AUTHENTICATING THAT THE DATA WERE INPUT BY A HUMAN

442 THE PROCESSOR IS A HOST COMPUTER

443 THE HOST COMPUTER IS A CLOUD SERVICE

443A THE HID IS REGISTERED WITH THE HOST COMPUTER SUCH THAT THE HID IS ASSOCIATED WITH AN ACCOUNT OF THE HID USER AT THE HOST COMPUTER

A

B

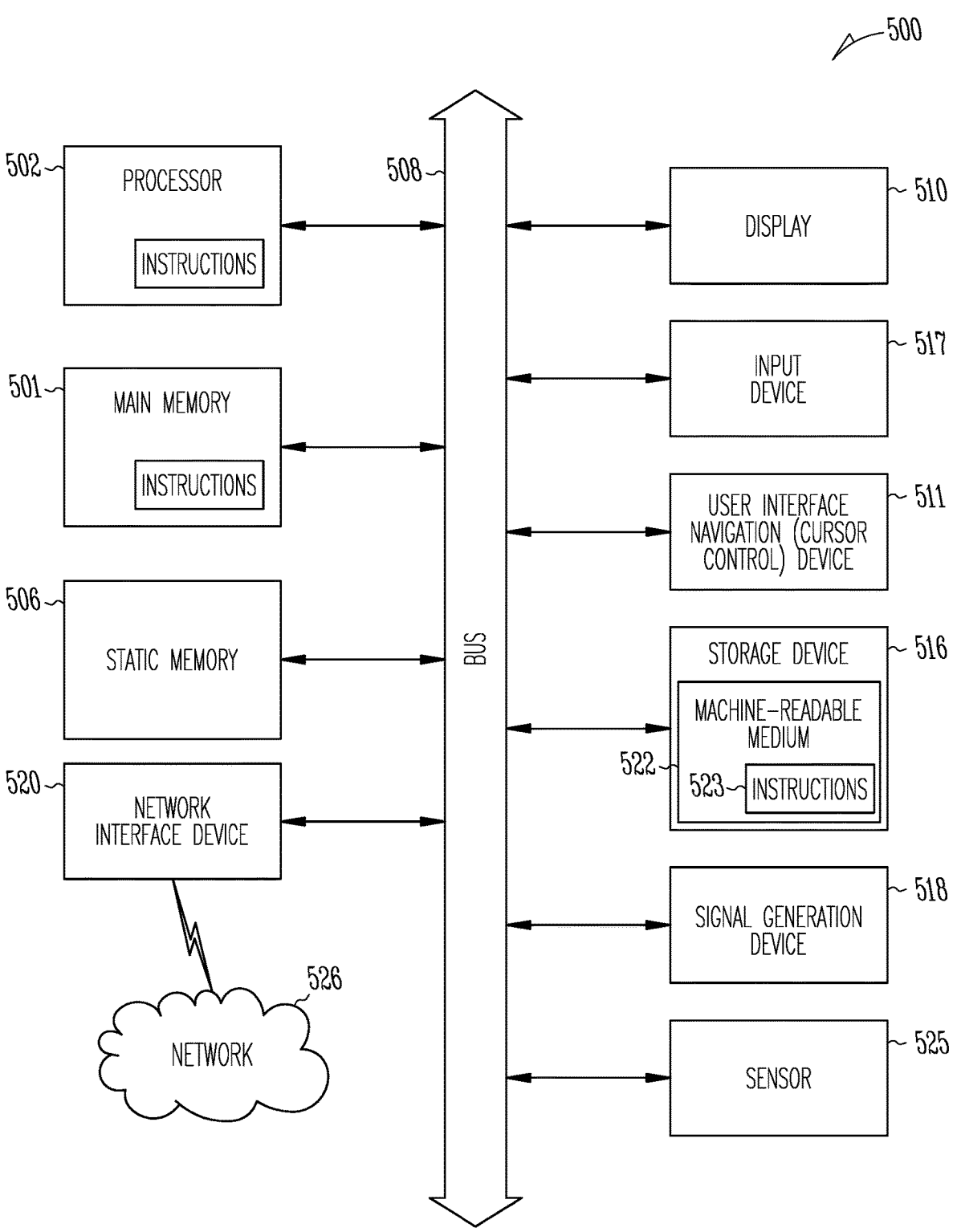
_Fig.5_

HARDWARE-INTEGRATED CRYPTOGRAPHIC SIGNING AND ENCRYPTION FOR HUMAN INTERFACE DEVICE ACTIONS

TECHNICAL FIELD

Embodiments described herein generally relate to human interface devices (HID), and in an embodiment, but not by way of limitation, authenticating that data inputted into the HID was input by a human.

BACKGROUND

Visual and reasoning-based CAPTCHA systems have become outmoded, defeated and obsolete due to advancements in Artificial Intelligence (AI) technologies, such as Multi-Modal Large Language Models (LLMs). This situation presents a significant problem that needs to be resolved. AI's capability to interpret, respond to, and solve CAPTCHA challenges undermines these security measures. This issue extends beyond CAPTCHA, affecting various aspects of online content. For instance, the increasing use of AI for completing school homework assignments is a notable example of how AI-generated content can impact educational integrity. Similarly, AI's involvement in creating fake reviews or generating misinformation online exacerbates the challenge of distinguishing authentic content from AI-generated material. With the rapid increase in AI-generated content, which is poised to surpass human-generated content in volume in the coming years, this situation needs the development of more advanced security methods to protect the integrity and security of online interactions and content to address this evolving challenge.

Additionally, remote administration of cloud services and servers through command line interfaces poses security risks. There is no way to cryptographically verify if the commands are coming from an authorized human administrator versus an automated script or hijacked account. Malicious actors can exploit this by using stolen credentials or compromised accounts to remotely execute harmful commands. Also, there is limited accountability over who exactly issued what commands in these text-based interfaces. The lack of logging and authentication for each keystroke allows unauthorized commands to be run anonymously. The art is therefore in need of an improved mechanism to authenticate, authorize and log every user input when administering critical cloud infrastructure through remote terminal sessions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 2 is a table illustrating fields in a report generated by a Human Input Device (HID) for use by a host, server or other processor to determine if data input at the HID was input by a human.

FIG. 3 is a table illustrating verification times of different encryption algorithms.

FIGS. 4A and 4B are a diagram illustrating operations and features of a system to authenticate and/or verify that input at a human interface device (HID) was executed by a human and not by a robot or other non-human means.

FIG. 5 is a computer architecture upon which one or more embodiments of the present disclosure can execute.

DETAILED DESCRIPTION

An embodiment addresses the challenges posed by CAPTCHA and AI-generated content by authenticating digital inputs as human-originated. Within the input device's framework, suitable for both standalone and integrated laptop keyboards and other human interface devices (HID), a cryptographic module signs each keystroke using the user's private key. The input can then be encrypted using the receiver's public key, ensuring data integrity and confidentiality from origin to destination. This process is enhanced by nonce generation and timestamping to ensure the integrity, nonrepudiation, and authenticity of the data. Furthermore, the user's public key can be attested by a third party, providing proof of the user's human identity. A secondary controller then organizes the signed data into a USB HID report for the host computer for compliance as use cases. An embodiment has the capacity to integrate quantum resistant cryptographic algorithms to ensure long-term viability against evolving threats. And by authenticating command inputs at the keystroke level, the method significantly enhances the security of remote administrative operations, and can be seamlessly integrated with zero-trust security architectures.

Figure 1:
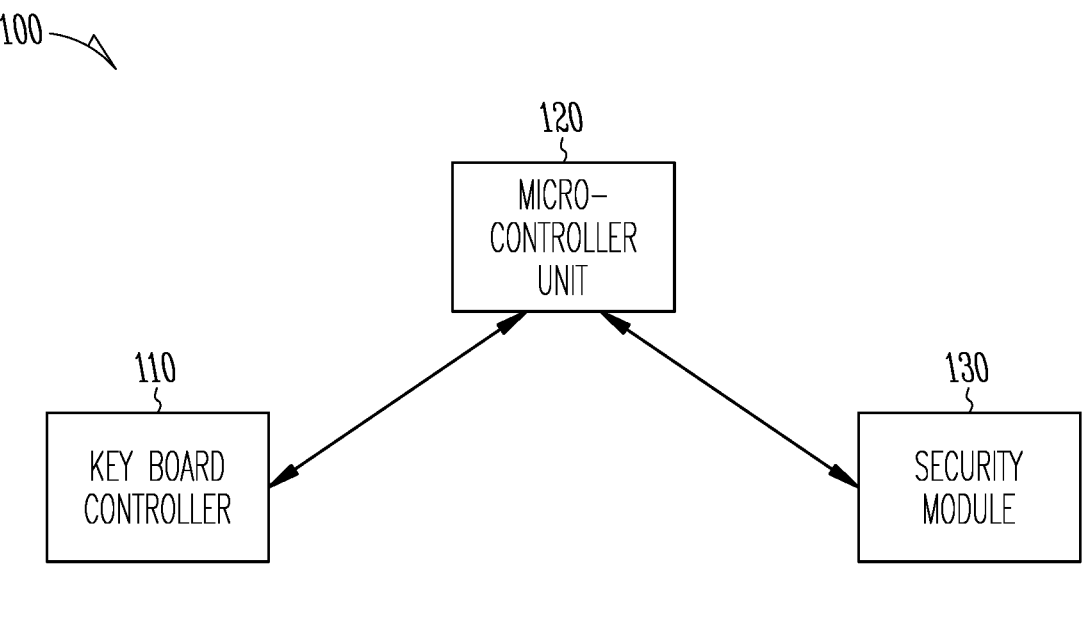
FIG. 1 is a block diagram of a system that can be used in a process to authenticate input at a Human Interface Device (HID) as originating from a human.

FIG. 1 is a block diagram of a system 100 that can be used in a process to authenticate input at an HID as originating from a human. In an embodiment, a process proceeds from a key press, mouse click or other human input to the generation of a USB HID report with custom fields. Specifically, a user presses a key on the keyboard, and the keyboard's internal matrix scan circuit detects the key press. The keyboard controller 110 (e.g., NT6868A) scans the matrix, identifies the pressed key, and generates a corresponding key code. The microcontroller unit (MCU) 120 receives the key code from the keyboard controller. The MCU 120 generates a nonce (a random number that is used once) and a timestamp for the keypress event. The MCU 120 sends the key code, nonce, and timestamp to a security module 130.

The security module 130 uses elliptic curve cryptography (ECC), RSA or other algorithm to sign the combined data (key code, nonce, timestamp) with the user's or the device's private key. The MCU 120 receives the signed data back from the security module 130, and it repackages all the data into a USB HID report. The report has both standard and custom fields.

The USB HID report fields are as follows. The standard fields include a Report ID (identifies the report format), a Modifier Byte (indicates modifier keys (like Shift, Ctrl) were pressed), a Reserved Byte (for alignment purposes), and a Keycode Bytes (standard key codes that have been pressed). The Custom Fields include a Timestamp (the exact time when the key was pressed), a Nonce (the random number generated for that particular event), a Signature (the cryptographic signature of the combined data), and a Key ID (an identifier for the cryptographic key used).

There is also a Device ID (identifier for the keyboard device) and Status Flags (various status flags (e.g., Caps Lock on/off)). The USB HID report, complete with custom fields, is sent over the USB interface to a host computer. The host computer receives the USB HID report and processes it accordingly. The custom fields are used by specialized software, as disclosed herein, to verify the authenticity of the keypress events.

The USB HID report fields are illustrated in tabular form in FIG. 2. The Report ID is standard across all HID devices to differentiate between various report formats. The Modifier Byte holds flags for keys like Shift, Ctrl, and so on. The Reserved Byte is often set to zero. The Keycode Bytes can hold up to six keycodes, which correspond to the keys being pressed simultaneously. The custom fields start with Timestamp, which is a UNIX-style timestamp representing when the keypress event occurred. The nonce is a randomly generated number used once to ensure the signature cannot be reused. The Signature field size varies because it depends on the encryption key length and signing algorithm. For example, RSA-2048 will require 256 bytes. As other examples, recommended post-quantum cryptographic Crystal-Dilithium may have 3293 bytes, whereas EC p384 signature size is 384 bits. The Key ID is useful if the system uses multiple keys and needs to specify which one was used for signing. The Device ID can help identify which keyboard was used if there are multiple devices. Finally, Status Flags can hold various information, such as the state of the Num Lock or Caps Lock.

In an embodiment, the system's architecture is designed to be adaptable to quantum-resistant cryptographic algorithms. As these algorithms are standardized and implemented, the cryptographic module within the keyboard system can be upgraded to utilize them, thereby ensuring resilience against potential quantum computing threats. Examples of quantum-resistant algorithms include lattice-based cryptography, hash-based signatures, and multivariate polynomial cryptography. The embodiment also includes a provision for third-party attestation of the user's public key, adding a layer of trust to the security model. This attestation ensures that the public key is indeed associated with a verified user, thereby confirming the human origin of the keystrokes. Additionally, for an extra layer of security, the public key of the intended receiver can be used to encrypt keystroke data. This means that even if the data were to be intercepted, the data could only be decrypted by the holder of the corresponding private key, ensuring that sensitive information remains confidential until it reaches the intended recipient.

Referring to FIG. 3, it is noted that the fastest typists can reach speeds of up to 250 words per minute (WPM). Considering the average English word is 4.7 characters long, this equates to approximately 21 keystrokes per second. The signature generation throughput for various cryptographic algorithms, as shown in FIG. 3, exceeds the required rate of 21 keystrokes per second (kps) by a significant margin.

Figure 4B:
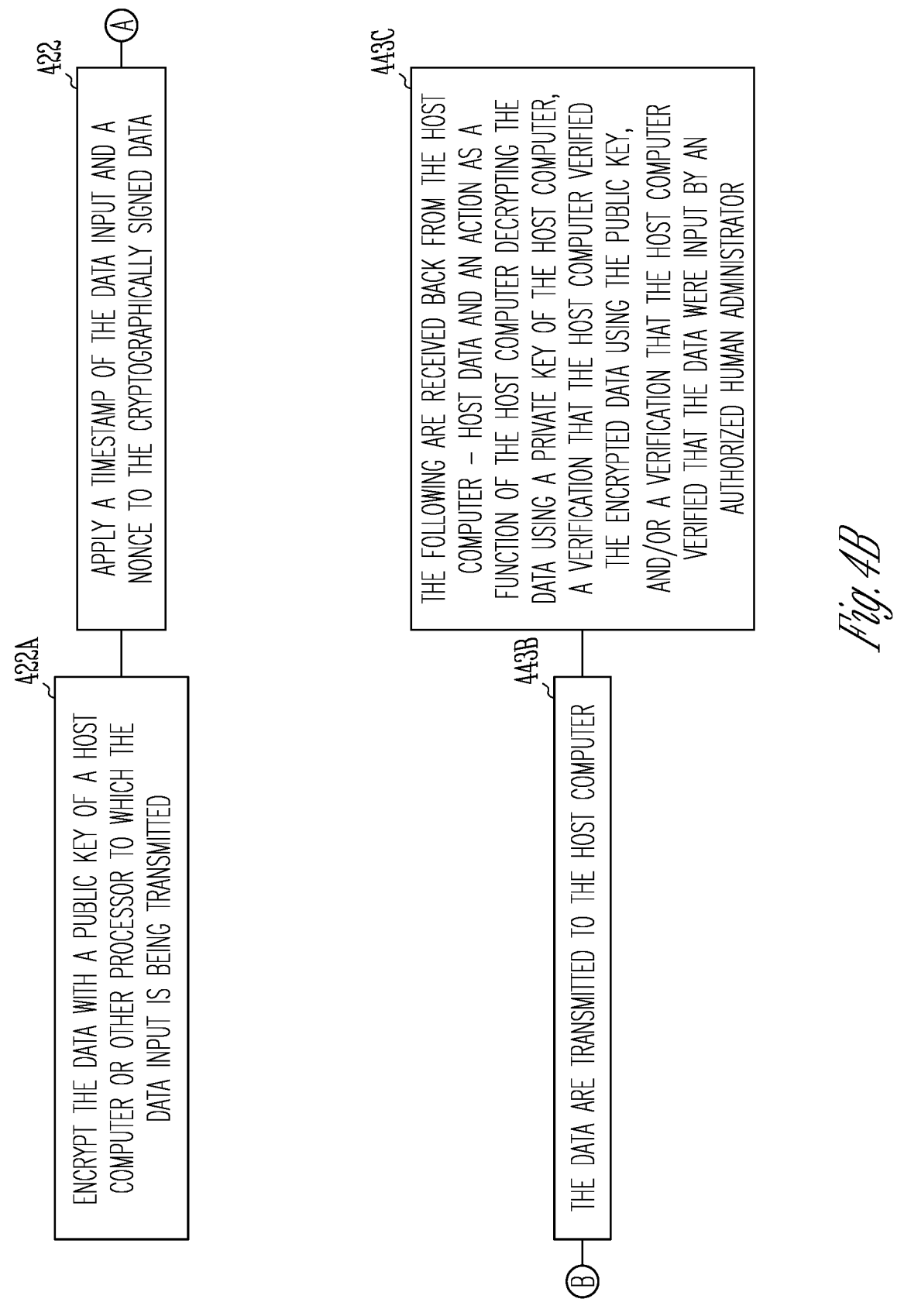

FIGS. 4A and 4B are a diagram illustrating operations and features of a system to authenticate and/or verify that input at a human interface device (HID) was executed by a human and not by a robot or other non-human means. FIGS. 4A and 4B include a number of process and feature blocks 410-443C. Though arranged substantially serially in the example of FIGS. 4A and 4B, other examples may reorder the blocks, omit one or more blocks, and/or execute two or more blocks in parallel using multiple processors or a single processor organized as two or more virtual machines or sub-processors.

Referring now to FIGS. 4A and 4B, at 410, data relating to input at a human interface device (HID) are received at the HID. As indicated at 412, the data can be a single keystroke, a single mouse click or any other data input at the HID such as voice data or retinal scan data.

At 420, the data are cryptographically signed using a private key of a user of the HID. At 422, a timestamp of the data input at the HID and a nonce are applied to the cryptographically signed data, and at 422A, the data are then encrypted with a public key of the host computer or other processor to which the data input is being transmitted. As indicated at 424, the private key of the user of the HID is securely stored in the HID. The cryptographic signing can include a quantum resistant algorithm (426).

At 430, a report is generated using the cryptographically signed data. As indicated at 432, the report comprises the cryptographically signed data, the encrypted data, the nonce, the timestamp, and attestation details. The report enables support of additional security layers within a standard HID communication framework.

At 440, the report is transmitted to a processor for use in authenticating that the data were input by a human. As indicated at 442, the processor can be a host computer, and as indicated at 443, the host computer can be a cloud service. When the host computer is a cloud service, as indicated at 443A, the HID is registered with the host computer such that the HID is associated with an account of the HID user at the host computer. Then, at 443B, the data are transmitted to the host computer. At 443C, the following are received back from the host computer - - - host data and an action as a function of the host computer decrypting the data using a private key of the host computer, a verification that the host computer verified the encrypted data using the public key, and/or a verification that the host computer verified that the data were input by an authorized human administrator.

Expanding on the operations of 443 in FIGS. 4A and 4B, remote terminal sessions in a cloud service environment are enhanced by integrating hardware-based cryptographic signing of every keystroke on the client side. An administrator's keyboard signs each key press locally before transmittal using the private key tied to that user's account. The remote server verifies the signature to authenticate the source as the authorized administrator. Each keystroke data packet includes a timestamp and nonce to prevent replay attacks. The commands can also be encrypted via session keys for confidentiality.

On the remote server or cloud server side, the authenticated and encrypted commands are decrypted, validated, and then executed after verification. Each keystroke is immutably logged in an auditable trail along with the verified user identity. This provides end-to-end accountability over who executed which commands. The cryptographic signing rooted in hardware keys prevents stolen credentials or automated scripts from being usable for remote administration. Only inputs from the authorized user's keyboard will be signed correctly and allow access. This embodiment enhances remote terminal sessions against unauthorized usage and provides irrefutable logging of all administrative actions. The cryptographic protections augment cloud security and provide safeguards against insider threats, stolen credentials, and account compromises that could otherwise be exploited to attack critical cloud infrastructure.

An overview of the process including device pairing/registration and the cloud server-side receipt of signed and encrypted keystrokes is as follows. A user registers his or her input device (keyboard, mouse, etc.) with a cloud provider to associate it with the user's account. The user's device generates a public-private key pair. The public key is shared with the cloud provider. The user's account is updated to include the device's public key for authentication. The device stores the private key securely for signing future inputs.

Then, the signed and Encrypted Keystroke Process is as follows. The user initiates a remote terminal/GUI session to access the cloud. The input device signs each keystroke/ click locally using the stored private key. The encrypted inputs are also encrypted with the user account's public key for confidentiality. The client user device transmits the encrypted and signed inputs to the server. The server decrypts the inputs using the account's private key, and the server verifies the signature on each input against the registered device's public key to authenticate the source. The validated inputs are logged and executed by the server. The server blocks the attempted action of a failed verification. A server log contains timestamped and attributed records of each user input.

FIG. 5 is a block diagram illustrating a computing and communications platform 500 in the example form of a general-purpose machine on which some or all the operations of FIGS. 4A and 4B may be carried out according to various embodiments. In certain embodiments, programming of the computing platform 500 according to one or more particular algorithms produces a special-purpose machine upon execution of that programming. In a networked deployment, the computing platform 500 may operate in the capacity of either a server or a client machine in server-client network environments, or it may act as a peer machine in peer-to-peer (or distributed) network environments.

Example computing platform 500 includes at least one processor 502 (e.g., a central processing unit (CPU), a graphics processing unit (GPU) or both, processor cores, compute nodes, etc.), a main memory 501 and a static memory 506, which communicate with each other via a link 508 (e.g., bus). The computing platform 500 may further include a video display unit 510, input devices 517 (e.g., a keyboard, camera, microphone), and a user interface (UI) navigation device 511 (e.g., mouse, touchscreen). The computing platform 500 may additionally include a storage device 516 (e.g., a drive unit), a signal generation device 518 (e.g., a speaker), a sensor 524, and a network interface device 520 coupled to a network 526.

The storage device 516 includes a non-transitory machine-readable medium 522 on which is stored one or more sets of data structures and instructions 523 (e.g., software) embodying or utilized by any one or more of the methodologies or functions described herein. The instructions 523 may also reside, completely or at least partially, within the main memory 501, static memory 506, and/or within the processor 502 during execution thereof by the computing platform 500, with the main memory 501, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 523. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is process comprising receiving at a human interface device (HID) data relating to input at the HID; cryptographically signing the data using a private key of a first user; generating a report using the cryptographically signed data; and transmitting the report to a processor for use in authenticating that the data were input by a human.

Example No. 2 includes all the features of Example No. 1, and optionally includes a process comprising applying one or more of a timestamp of the data input at the HID and a nonce as part of the cryptographically signed data.

Example No. 3 includes all the features of Example Nos. 1-2, and optionally includes a process comprising encrypting the data with a public key of a second user.

Example No. 4 includes all the features of Example Nos. 1-3, and optionally includes a process wherein the report comprises the cryptographically signed data, the encrypted data, the nonce, the timestamp, and attestation details, thereby enabling support of additional security layers within a standard HID communication framework.

Example No. 5 includes all the features of Example Nos. 1-4, and optionally includes a process wherein the processor comprises a host computer.

Example No. 6 includes all the features of Example Nos. 1-5, and optionally includes a process wherein the host computer comprises a cloud service.

Example No. 7 includes all the features of Example Nos. 1-6, and optionally includes a process comprising registering the HID with the host computer such that the HID is associated with an account of the first user at the host computer.

Example No. 8 includes all the features of Example Nos. 1-7, and optionally includes a process comprising transmitting the data to the host computer; and receiving back from the host computer one or more of host data and an action as a function of the host computer decrypting the data using a private key of the host computer, the host computer verifying the encrypted data using the public key, and the host computer verifying that the data were input by an authorized human administrator.

Example No. 9 includes all the features of Example Nos. 1-8, and optionally includes a process wherein the data comprise a single keystroke or a single mouse click.

Example No. 10 includes all the features of Example Nos. 1-9, and optionally includes a process wherein the private key of the first user is securely stored in the HID.

Example No. 11 includes all the features of Example Nos. 1-10, and optionally includes a process wherein the cryptographic signing comprises a quantum resistant algorithm.

Example No. 12 is a system comprising a human interface device (HID); and an HID processor couple to the HID; wherein the HID and the HID processor are configured for receiving at the HID data relating to input at the HID; cryptographically signing the data using a private key of a first user; generating a report using the cryptographically signed data; and transmitting the report to a second processor for use in authenticating that the data were input by a human.

Example No. 13 includes all the features of Example No. 12, and optionally includes a system wherein the HID and the HID processor are configured for applying one or more of a timestamp of the data input at the HID and a nonce as part of the cryptographically signed data.

Example No. 14 includes all the features of Example Nos. 12-13, and optionally includes a system wherein the HID and the HID processor are configured for encrypting the data with a public key of a second user.

Example No. 15 includes all the features of Example Nos. 12-14, and optionally includes a system wherein the report comprises the cryptographically signed data, the encrypted data, the nonce, the timestamp, and attestation details, thereby enabling support of additional security layers within a standard HID communication framework.

Example No. 16 includes all the features of Example Nos. 12-15, and optionally includes a system wherein the second processor comprises a host computer.

Example No. 17 includes all the features of Example Nos. 12-16, and optionally includes a system wherein the host computer comprises a cloud service.

Example No. 18 includes all the features of Example Nos. 12-17, and optionally includes a system wherein the HID and the HID processor are configured to registering the HID with the host computer such that the HID is associated with an account of the first user at the host computer.

Example No. 19 includes all the features of Example Nos. 12-18, and optionally includes a system wherein the HID and the HID processor are configured for transmitting the data to the host computer; and receiving back from the host computer one or more of host data and an action as a function of the host computer decrypting the data using a private key of the host computer, the host computer verifying the encrypted data using the public key, and the host computer verifying that the data were input by an authorized human administrator.

Example No. 20 includes all the features of Example Nos. 12-19, and optionally includes a system wherein the data comprise a single keystroke or a single mouse click; wherein the private key of the first user is securely stored in the HID; and wherein the cryptographic signing comprises a quantum resistant algorithm.

The invention claimed is:

1. A process comprising:
   receiving at a human interface device (HID) data relating to input at the HID;
   cryptographically signing the data using a private key of a first user;
   generating a report using the cryptographically signed data; and
   transmitting the report to a processor for use in authenticating that the data were input by a human.

2. The process of claim 1, comprising: applying one or more of a timestamp of the data input at the HID and a nonce as part of the cryptographically signed data.

3. The process of claim 2, comprising: encrypting the data with a public key of a second user.

4. The process of claim 3, wherein the report comprises the cryptographically signed data, the encrypted data, the nonce, the timestamp, and attestation details; and enabling support of additional security layers within a standard HID communication framework.

5. The process of claim 3, wherein the processor comprises a host computer.

6. The process of claim 5, wherein the host computer comprises a cloud service.

7. The process of claim 6, comprising: registering the HID with the host computer; wherein the HID is associated with an account of the first user at the host computer.

8. The process of claim 7, comprising: transmitting the data to the host computer; and receiving back from the host computer one or more of host data and an action as a function of the host computer encrypting the data using a private key of the host computer, the host computer verifying the encrypted data using the public key, and the host computer verifying that the data were input by an authorized human administrator.

9. The process of claim 1, wherein the data comprise a single keystroke or a single mouse click.

10. The process of claim 1, wherein the private key of the first user is securely stored in the HID.

11. The process of claim 1, wherein the cryptographic signing comprises a quantum resistant algorithm.

12. A system comprising:
a human interface device (HID); and
an HID processor couple to the HID;
wherein the HID and the HID processor are configured for:
receiving at the HID data relating to input at the HID;
cryptographically signing the data using a private key of a first user;
generating a report using the cryptographically signed data; and
transmitting the report to a second processor for use in authenticating that the data were input by a human.

13. The system of claim 12, wherein the HID and the HID processor are configured for applying one or more of a timestamp of the data input at the HID and a nonce as part of the cryptographically signed data.

14. The system of claim 13, wherein the HID and the HID processor are configured for encrypting the data with a public key of a second user.

15. The system of claim 14, wherein the report comprises the cryptographically signed data, the encrypted data, the nonce, the timestamp, and attestation detail; and enabling support of additional security layers within a standard HID communication framework.

16. The system of claim 14, wherein the second processor comprises a host computer.

17. The system of claim 16, wherein the host computer comprises a cloud service.

18. The system of claim 17, wherein the HID and the HID processor are configured to registering the HID with the host computer; and wherein the HID is associated with an account of the first user at the host computer.

19. The system of claim 18, wherein the HID and the HID processor are configured for transmitting the data to the host computer; and receiving back from the host computer one or more of host data and an action as a function of the host computer encrypting the data using a private key of the host computer, the host computer verifying the encrypted data using the public key, and the host computer verifying that the data were input by an authorized human administrator.

20. The system of claim 12, wherein the data comprise a single keystroke or a single mouse click; wherein the private key of the first user is securely stored in the HID; and wherein the cryptographic signing comprises a quantum resistant algorithm.

\* \* \* \* \*